T. L. BURTON.
BRAKE SLACK ADJUSTER.
APPLICATION FILED NOV. 6, 1917.
1,309,933. Patented July 15, 1919.
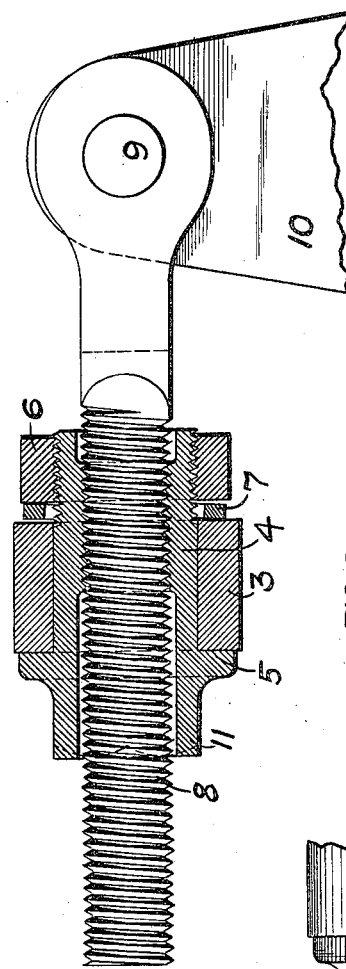
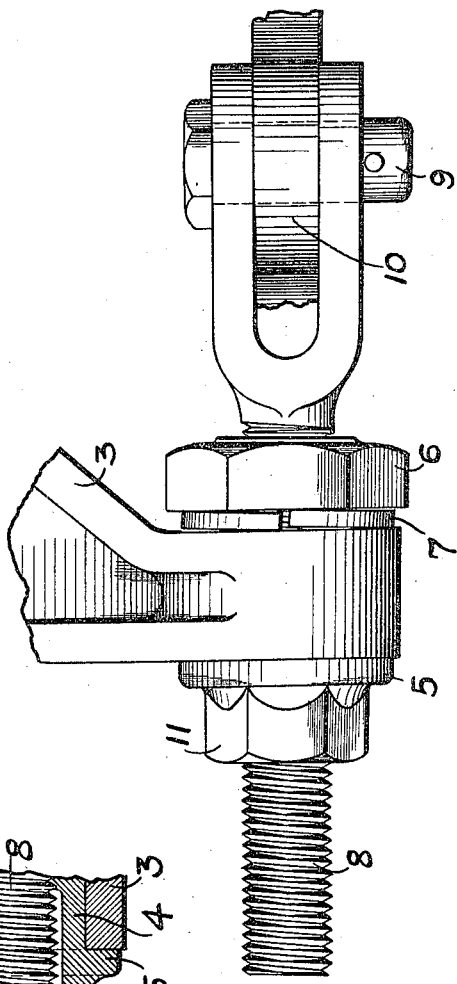
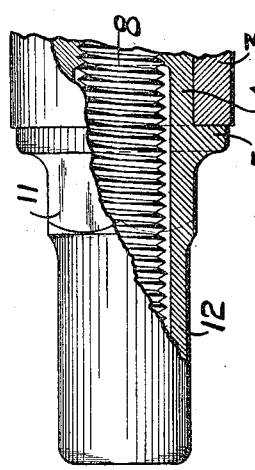
INVENTOR
Thomas L. Burton
by Edward H. Wright
Atty

UNITED STATES PATENT OFFICE.

THOMAS L. BURTON, OF ST. LOUIS, MISSOURI, ASSIGNOR TO AMERICAN BRAKE COMPANY, OF ST. LOUIS, MISSOURI, A CORPORATION OF MISSOURI.

BRAKE SLACK-ADJUSTER.

1,309,933.                Specification of Letters Patent.       Patented July 15, 1919.

Application filed November 6, 1917. Serial No. 200,499.

*To all whom it may concern:*

Be it known that I, THOMAS L. BURTON, a citizen of the United States, residing at St. Louis, in the State of Missouri, have invented a certain new and useful Improvement in Brake Slack-Adjusters, of which improvement the following is a specification.

This invention relates to brake slack adjusters and has for its object to provide improved manually adjustable mechanism for shifting the fulcrum of a truck lever of the brake system to take up the slack therein produced by the wear of the brake shoes and other causes.

In the accompanying drawing Figure 1 is a vertical section, and Fig. 2, a plan of a slack adjusting mechanism embodying my improvement, and Fig. 3 is a sectional view showing a modified form of nut.

According to the form of the improvement shown, a bracket 3, is adapted to be rigidly supported on the truck frame in any suitable manner and carries an interiorly threaded nut 4, rotatably mounted therein. The nut is provided with a shoulder 5, bearing against one side of the bracket while the other end of the adjuster nut carries a lock nut 6, and spring washer 7, bearing against the other side of said bracket.

Within the adjuster nut 4, is mounted the threaded fulcrum rod or adjusting screw 8, carrying at its inner end the pivot 9, on which is mounted a dead truck lever 10 of the brake rigging.

As the adjuster nut is rotated within the fulcrum bracket the screw 8 is adjusted longitudinally therein, thereby shifting the fulcrum of the dead truck lever to take up the slack in the brake rigging as will be readily understood.

The nut 4, may be turned by hand or manually by a wrench applied to the hexagonal portion 11. The nut may also be provided with a hollow extension or cap, 12, as shown in Fig. 3, inclosing the end of the adjusting screw for excluding the dirt and dust from the threaded portion of the screw. The lock nut and washer hold the adjuster nut within the bracket with a sufficient friction to prevent lost motion but not too tight to allow for freely turning the adjuster nut to shift the screw longitudinally when it is desired to take up the slack.

What I claim as new and desire to secure by Letters Patent is:

1. A slack adjuster comprising a rigid fulcrum bracket, an adjuster nut rotatably mounted in said bracket and having a shoulder at one side thereof, a locking means on said adjuster nut at the other side of the bracket, and an adjusting screw extending longitudinally through said nut and carrying a fulcrum for a truck lever.

2. A slack adjuster comprising a rigid fulcrum bracket, an adjuster nut rotatably mounted in said bracket and having a shoulder at one side thereof, a lock nut and washer mounted on the adjuster nut at the other side of the bracket, and an adjusting screw extending through said adjuster nut.

In testimony whereof I have hereunto set my hand.

THOMAS L. BURTON.

Copies of this patent may be obtained for five cents each, by addressing the "Commissioner of Patents, Washington, D. C."